(12) United States Patent
McIntyre

(10) Patent No.: US 10,872,340 B2
(45) Date of Patent: Dec. 22, 2020

(54) FRAUD COMPLIANCE DEVICE FOR CARD READING APPARATUS

(71) Applicant: SecureState, LLC, Cleveland, OH (US)

(72) Inventor: Spencer McIntyre, Twinsburg, OH (US)

(73) Assignee: RSM US LLP, Chicago, IL (US)

( * ) Notice: Subject to any disclaimer, the term of this patent is extended or adjusted under 35 U.S.C. 154(b) by 539 days.

(21) Appl. No.: 15/812,108

(22) Filed: Nov. 14, 2017

(65) Prior Publication Data

US 2019/0147447 A1    May 16, 2019

(51) Int. Cl.
  *G06Q 20/40* (2012.01)
  *G07F 19/00* (2006.01)
  *G06Q 20/34* (2012.01)

(52) U.S. Cl.
  CPC ....... *G06Q 20/4016* (2013.01); *G06Q 20/341* (2013.01); *G07F 19/2055* (2013.01)

(58) Field of Classification Search
  CPC .............. G06Q 20/341; G06Q 20/4016; G07F 19/2055
  See application file for complete search history.

(56) References Cited

U.S. PATENT DOCUMENTS

| | | |
|---|---|---|
| 6,186,402 B1 | 2/2001 | Johnson |
| 7,389,916 B2 | 6/2008 | Chirnomas |
| 8,469,264 B1 * | 6/2013 | Almeida ............... G07F 19/205 235/379 |
| 9,033,222 B2 | 5/2015 | Baser et al. |
| 9,477,958 B2 | 10/2016 | Sharifi Mehr |
| 2007/0158432 A1 | 7/2007 | Tadamasa |
| 2014/0312117 A1 | 10/2014 | Neubauer |
| 2014/0372305 A1 | 12/2014 | Ray et al. |

(Continued)

FOREIGN PATENT DOCUMENTS

WO    2009/109543 A1    9/2009

OTHER PUBLICATIONS

"Fundamentals of Credit Card Skimmer Fraud. It's important to understand what a credit card skimmer is and how the device is used." Jac Brittain, LPC, Apr. 27, 2017. Retail Fraud. 4 pages.

(Continued)

*Primary Examiner* — Laura A Gudorf
(74) *Attorney, Agent, or Firm* — Eschweiler & Potashnik, LLC

(57)   ABSTRACT

An apparatus for monitoring compliance in fraud-prevention associated with a card reader device has a body to be selectively coupled to the card reader device at a coupling region of the card reader device. The body substantially mimics and at least partially overlays the coupling region of the card reader device when coupled to the coupling region. The card reader device has an opening for accepting a card containing electronic data. The body has a card-accepting region associated with the opening that is configured to substantially surround a periphery of the opening when the body is coupled to the card reader device. The card-accepting region permits the card to be at least partially inserted into the opening for reading of the electronic data by the card reader device when the body is coupled to the card reader device. The body further has no capacity to read the electronic data encoded in the machine-readable medium.

19 Claims, 3 Drawing Sheets

(56) References Cited

U.S. PATENT DOCUMENTS

2016/0034899 A1\* 2/2016 Myers .................. H04B 5/0081
 705/44
2018/0060578 A1\* 3/2018 Kim ........................ G06F 21/86

OTHER PUBLICATIONS

"How a business owner can prevent Credit Card Skimming." cynergydatatexas. 3 pages, Mar. 22, 2016.
Eddy, Max, "How to Spot and Avoid Credit Card Skimmers." Apr. 5, 2016. 7 pages.
Author: Skimming Prevention Task Force. "Information Supplemental Skimming Prevention: Best Practices for Merchants." Version 2.0, PCI Security Standards Council, Standards: PCI PIN Transaction Security Program Requirements and PCI Data Security Standard (PCI DSS). Sep. 2014, 36 pages.

\* cited by examiner

FRAUD COMPLIANCE DEVICE FOR CARD READING APPARATUS

TECHNICAL FIELD

The present invention relates generally to card reading systems, and more particularly, to a system, apparatus, and method for monitoring fraud compliance in monitoring of point-of-sale systems.

BACKGROUND

Card skimming generally refers to the practice of attaching a fraudulent device (commonly referred to as a "skimmer") to a financial transaction apparatus, such as a Point of Sale (POS) device or Automated Teller Machine (ATM). The financial transaction apparatus is normally configured to utilize data from a bank card (e.g., a credit card or ATM card) that a consumer inserts into a slot in the financial transaction apparatus in order to commence a financial transaction. The bank card typically stores the personal data (e.g., name, bank or credit account numbers, etc.) on a magnetic stripe or microchip, whereby the fraudulent device records or "skims" the data when the bank card passes by the fraudulent device while being inserted into the financial transaction apparatus. The data obtained by the fraudulent device may be used to create counterfeit cards with genuine data encoded on their magnetic stripes or microchips, whereby the counterfeit cards may be used to withdraw funds, conduct credit transactions in alternate locations, or be used or otherwise sold or traded on the internet to other criminals.

Typically, the consumer is unaware that their personal data is skimmed or stolen, as the skimmer is often disguised to mimic the appearance of the legitimate financial transaction apparatus. For example, a typical skimmer will be manufactured within fine tolerances to snugly fit over the slot and/or keypad associated with the financial transaction apparatus, and the color, material, and texture are very similar to the color, material, and texture of the legitimate financial apparatus.

In order to mitigate theft caused by the fraudulent use of such skimmers, store clerks, bank attendants, or other legitimate business employees or supervisors in charge of the operation of the financial transaction apparatus are often asked to perform routine checks or investigations of the financial transaction apparatus in order to verify that fraudulent skimmers are not being used or otherwise attached to their legitimate equipment. Such routine checks are often logged for future verification or compliance with banking or financial regulations. However, the logging of such checks is open to misuse or abuse, itself, whereby an employee may falsely indicate that a check was performed when no actual investigation of the financial transaction apparatus was performed. Likewise, the employee(s) may be unfamiliar with the financial transaction apparatus, themselves, whereby the employee(s) may be similarly fooled by a fraudulent skimmer. As such, compliance with the monitoring of activities directed toward the prevention of fraudulent activities associated with financial transaction apparatuses has been traditionally difficult to verify and/or quantify.

SUMMARY

The present disclosure provides a system, apparatus, and method for monitoring fraud compliance in monitoring of point-of-sale systems and other systems utilizing financial cards. Accordingly, the following presents a simplified summary of the invention in order to provide a basic understanding of some aspects of the invention. This summary is not an extensive overview of the invention. It is intended to neither identify key or critical elements of the invention nor delineate the scope of the invention. Its purpose is to present some concepts of the invention in a simplified form as a prelude to the more detailed description that is presented later.

In accordance with one exemplary aspect of the present disclosure a compliance apparatus for monitoring compliance in fraud-prevention associated with a card reader device is provided. The compliance apparatus, for example, comprises a body configured to be selectively coupled to the card reader device at a coupling region of the card reader device. The body, for example, is configured to substantially mimic and at least partially overlay the coupling region of the card reader device when coupled to the coupling region.

The card reader device, for example, may comprise an opening configured to accept a card containing electronic data encoded in a machine-readable medium. Accordingly, the body of the compliance device comprises a card-accepting region associated with the opening, wherein the card-accepting region is configured to substantially surround a periphery of the opening when the body is coupled to the card reader device. The card-accepting region, for example, permits the card to be at least partially inserted into the opening for reading of the electronic data by the card reader device when the body is coupled to the card reader device. However, the body has no capacity to read the electronic data encoded in the machine-readable medium. Thus, the compliance apparatus does not read, accumulate, transmit, or otherwise disseminate the electronic data encoded on the card, but rather, advantageously provides an indication as to whether various fraud-checking regulations are being complied with by attempting to imitate a criminal credit card skimmer.

In accordance with one example, the card reader device comprises one of a chip reader and a magnetic stripe reader associated with the opening, and wherein the card-accepting region permits one of a respective chip and magnetic stripe of the card to be selectively inserted into the opening through the compliance device.

In another example, the coupling region of the card reader device comprises an alphanumeric keypad having a plurality of keys. As such, the body of the compliance device further comprises a keypad region, wherein the keypad region is configured to substantially overlay the alphanumeric keypad without impeding an operation of the plurality of keys. The keypad region of the body, for example, is substantially grid-shaped and comprises a plurality of key openings defined by a plurality of intersecting bar members, wherein the plurality of keys of the alphanumeric keypad are configured to respectively pass through the plurality of key openings. In another example, the body further comprises a shroud extending outwardly from the keypad region, wherein the shroud at least partially surrounds a periphery of the keypad region.

According to another example, the body comprises one or more engagement features configured to selectively engage the coupling region of the card reader device, thereby selectively coupling the body to the card reader device. The one or more engagement features, for example, comprise one or more of a snap-lock feature, a friction-fit feature, and an interference-fit feature configured to selectively couple the body to the coupling region of the card reader device.

Alternatively, an adhesive may be provided and configured to selectively couple the body to the coupling region of the card reader device.

The body of the compliance device, for example, may further comprise one or more electronic features configured to substantially mimic the coupling region of the card reader device. For example, the one or more electronic features may comprise one or more lights configured to selectively illuminate according to one or more predetermined conditions. The one or more predetermined conditions, for example, may comprise one or more of an insertion of the card into the opening, a presence of the card within the card accepting region, and an activation of one or more devices associated with the card reader device.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of a few of the various ways in which the principles of the invention may be employed. Other objects, advantages and novel features of the invention will become apparent from the following detailed description of the invention when considered in conjunction with the drawings.

DETAILED DESCRIPTION

Figure 1:
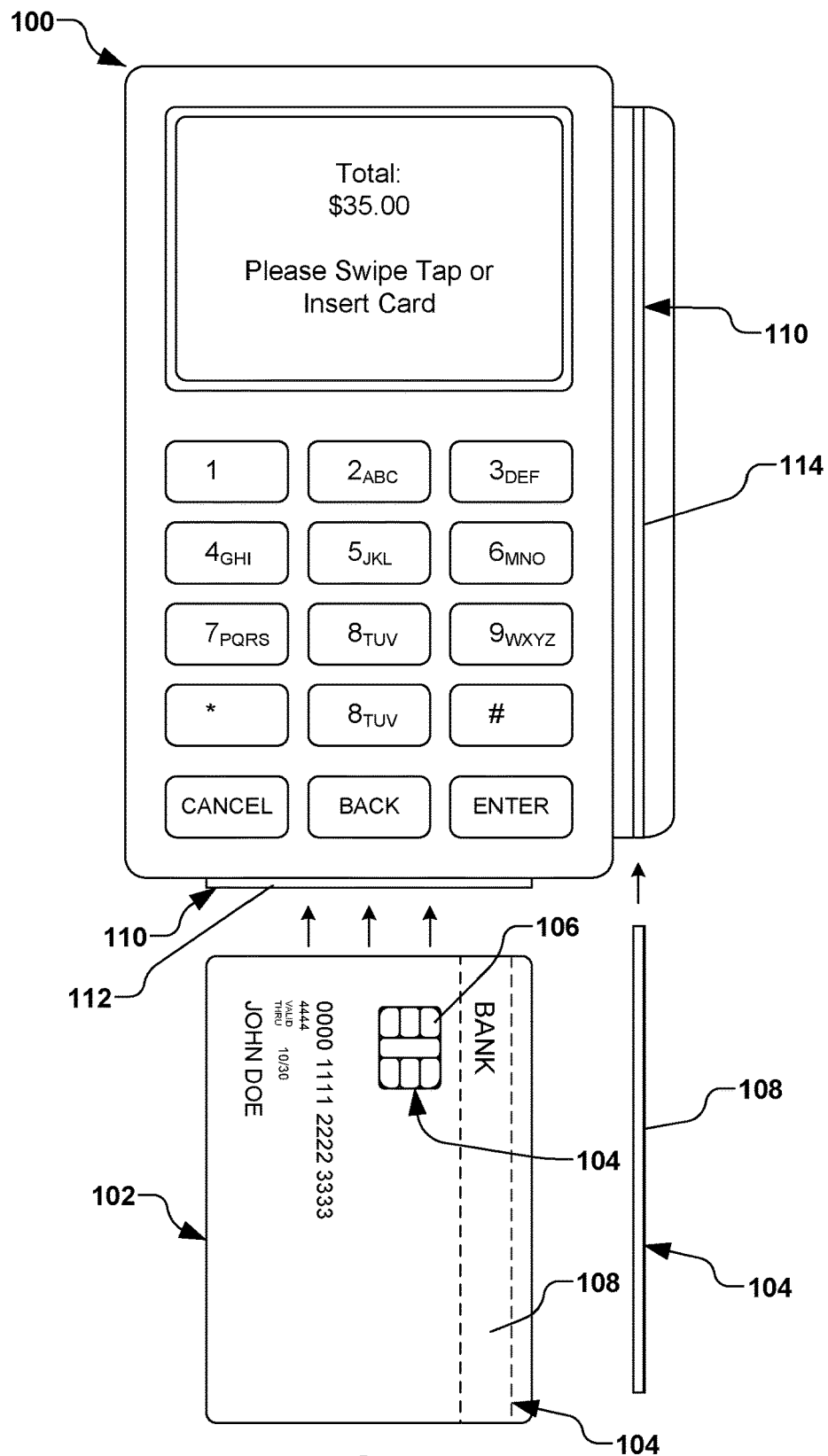
FIG. 1 is a plan view of a card reader apparatus and bank card according to several examples.

The present disclosure is directed generally toward a system, apparatus, and method for providing fraud monitoring compliance using card processing systems. More particularly, the present disclosure is directed toward aiding monitoring of compliance with standards dedicated to the physical security of cardholder data protect said data from criminals via the provisional of a compliance apparatus that may be selectively coupled to a card reader device. The compliance apparatus, for example, may be aesthetically similar to a skimming apparatus used by criminals for fraudulently acquiring the cardholder data, while having no capacity to read said cardholder data, thus not placing the cardholder data at risk.

Accordingly, the present invention will now be described with reference to the drawings, wherein like reference numerals may be used to refer to like elements throughout. It is to be understood that the description of these aspects are merely illustrative and that they should not be interpreted in a limiting sense. In the following description, for purposes of explanation, numerous specific details are set forth in order to provide a thorough understanding of the present invention. It will be evident to one skilled in the art, however, that the present invention may be practiced without these specific details. Further, the scope of the invention is not intended to be limited by the embodiments or examples described hereinafter with reference to the accompanying drawings, but is intended to be only limited by the appended claims and equivalents thereof.

It is also noted that the drawings are provided to give an illustration of some aspects of embodiments of the present disclosure and therefore are to be regarded as schematic only. In particular, the elements shown in the drawings are not necessarily to scale with each other, and the placement of various elements in the drawings is chosen to provide a clear understanding of the respective embodiment and is not to be construed as necessarily being a representation of the actual relative locations of the various components in implementations according to an embodiment of the invention. Furthermore, the features of the various embodiments and examples described herein may be combined with each other unless specifically noted otherwise.

It is also to be understood that in the following description, any direct connection or coupling between functional blocks, devices, components, circuit elements or other physical or functional units shown in the drawings or described herein could also be implemented by an indirect connection or coupling. Furthermore, it is to be appreciated that functional blocks or units shown in the drawings may be implemented as separate features or components in one embodiment, and may also or alternatively be fully or partially implemented in a common feature or component in another embodiment.

As illustrated in FIG. 1, a conventional card reader 100 is shown, wherein the card reader is configured to accept a card 102 containing electronic data encoded on a machine readable medium 104. The machine readable medium 104, for example, may comprise one or more of a microchip 106 and a magnetic stripe 108 operably coupled to the card 102. The electronic data that is encoded on the machine readable medium 104 may comprise information such as a name, bank account number, expiration date, as well as other data commonly used in financial transactions. The electronic data may be further encrypted on the microchip 106.

In a conventional use of the card reader 100, a user may insert the card 102 into one or more openings 110 for reading of the electronic data by the card reader. The one or more openings, for example, may comprise a chip reader slot 112 into which the microchip 106 is inserted, and a stripe reader slot 114 through which the magnetic stripe 108 is swiped for reading of the electronic data therefrom.

It is known that criminals have developed technologies for surreptitiously retrieving or "skimming" the electronic data from the card 102 upon the user's insertion of the card into the card reader 100 by attaching a "skimmer" device (not shown) to the card reader device. Typically, the skimmer device is placed over the one or more openings 110 such that the one or more openings permit electronic data on the card 102 to continue to be read by the card reader, while also recording or transmitting the electronic data in the skimmer for future retrieval or use by the criminal. Thus, all known skimmers contain electronics configured to at least read the electronic data, and some skimmers are configured to store the data, while others are configured to electronically transfer (e.g., wirelessly or and/over the internet) the electronic data back to the criminal.

Such skimmers are typically illegal, and an owner or operator of the card reader 102 is often expected to review, inspect, or otherwise check the card reader for the presence of a skimmer in order to not only protect their customer's electronic data, but also to possibly comply with various rules or regulations set by governments, governing boards or other entities. Security standards such as those set by the Payment Card Industry Data Security Standard (PCI DSS)

Requirement 9.9, for example, lists various requirements for organizations to follow in order to maintain the security of their devices such as card readers 102. For example, PCI DSS Requirement 9.9 mandates that card readers be periodically inspected for indications of tampering or substitution. However, while such standards and requirements are in place to protect the customer's electronic data, it is often difficult for organizations to ensure that their employees are fulfilling their duties to inspect card readers for tampering.

Figure 2A:
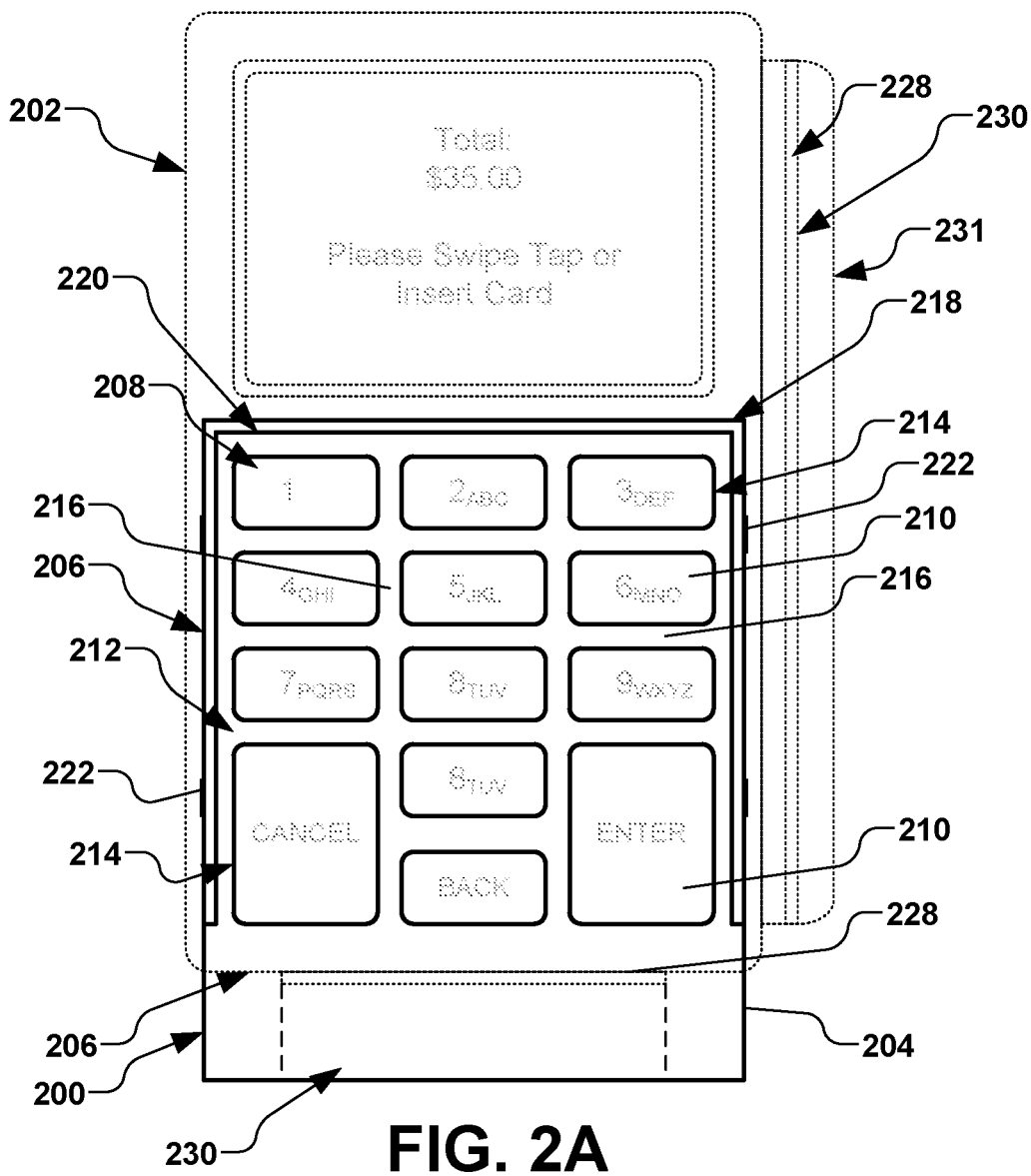
FIGS. 2A and 2B are respective plan and front side views of a compliance apparatus for monitoring compliance in fraud-prevention in accordance with several examples of the present disclosure.
Figure 2B:
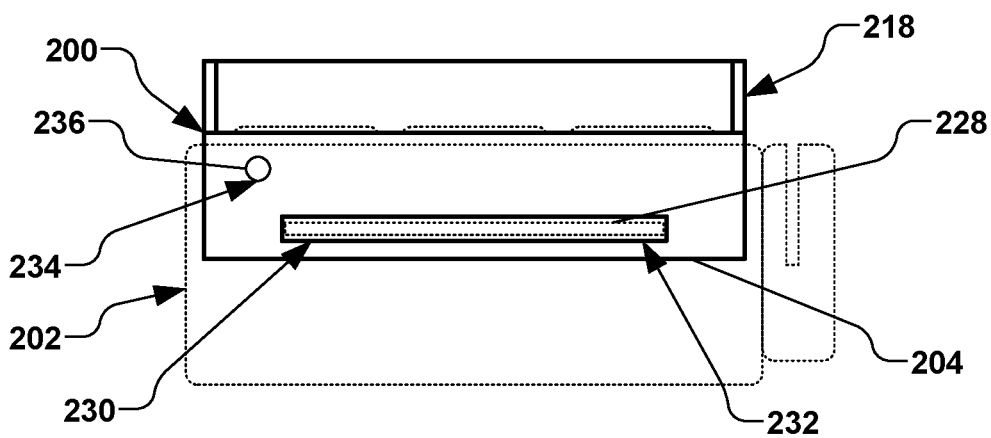

Accordingly, as illustrated in the example of FIGS. 2A-2B, the present disclosure advantageously provides a compliance apparatus 200 for monitoring compliance in fraud-prevention associated with a card reader device 202, such as a Point-Of-Sale (POS) device or an Automated Teller Machine (ATM). It should be noted that while the card reader device 202 is shown as being similar to the card reader device 100 of FIG. 1, the present disclosure contemplates various other configurations of the card reader device, and the present example should not be considered as limiting.

In accordance with one exemplary aspect of the present disclosure, the compliance apparatus 200 of FIG. 2A, for example, comprises a body 204 configured to be selectively coupled to the card reader device 202 at a coupling region 206 of the card reader device. The body 204, for example, is configured to substantially mimic and at least partially overlay the coupling region 206 of the card reader device 202 when the body is coupled to the coupling region. For example, the coupling region 206 of the card reader device 202 may comprise an alphanumeric keypad 208 having a plurality of keys 210. As such, the body 204 may further comprise a keypad region 212, wherein the keypad region is configured to substantially overlay the alphanumeric keypad 208 of the card reader device 202 without impeding an operation of the plurality of keys 210.

Figure 3:
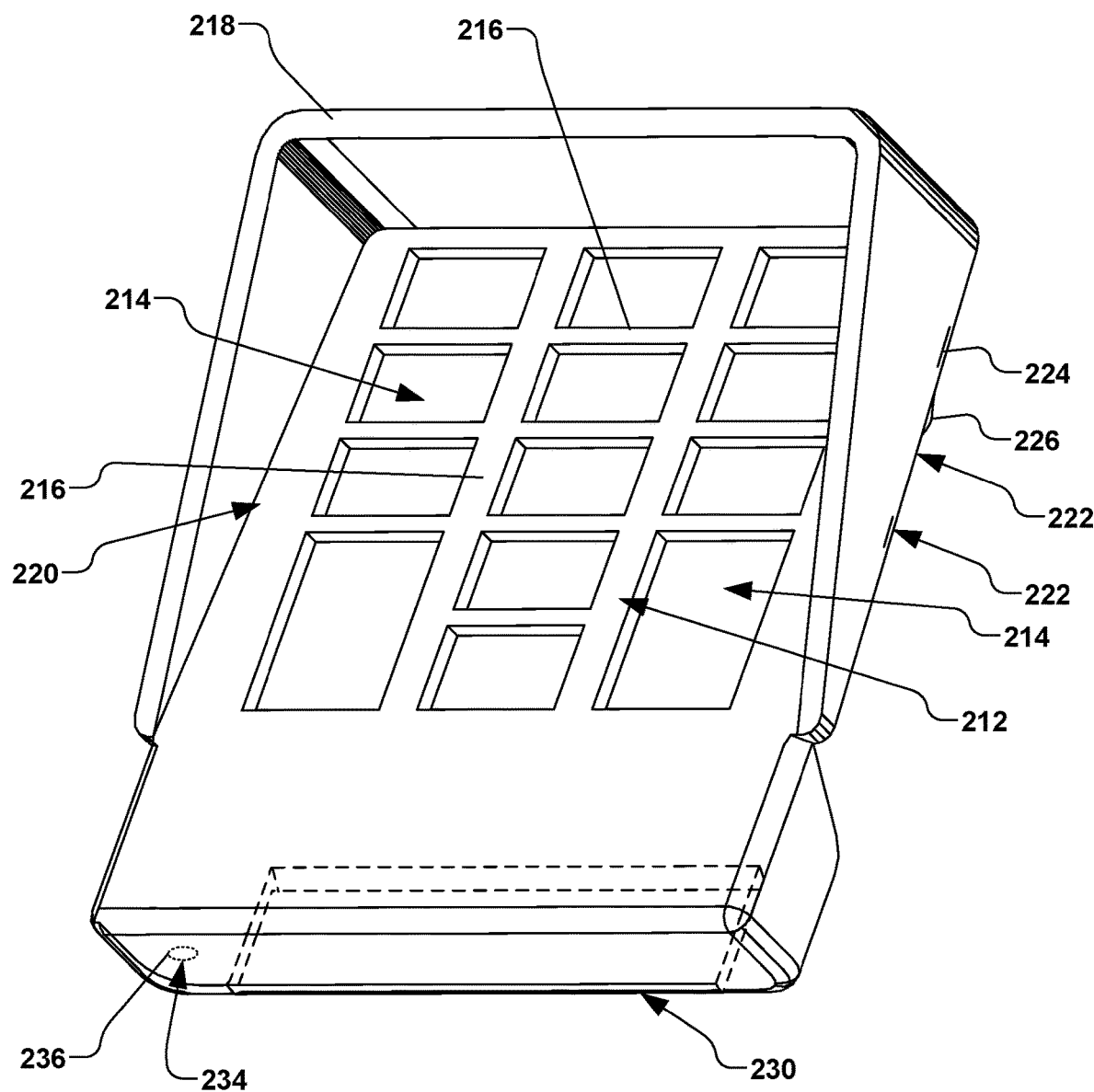
FIG. 3 is a perspective view of an exemplary fraud compliance apparatus in accordance with several examples of the present disclosure.

The keypad region 212 of the body 204, for example, may be substantially grid-shaped, wherein the keypad region comprises a plurality of key openings 214 defined by a plurality of intersecting bar members 216, as illustrated in greater detail in FIG. 3. Accordingly, the plurality of key openings 214 are configured to respectively pass the plurality of keys 210 of the alphanumeric keypad 208 of the card reader 202 of FIG. 2A therethrough. It should be noted that a specific number, size, and orientation of the plurality of key openings 214 are illustrated and described herein, various other configurations of the alphanumeric keypad 208 are contemplated, whereby the body 204 may be likewise configured to mate with the various other configurations.

In one example, the body 204 of the compliance apparatus 200 of FIG. 3 comprises a shroud 218 (e.g., a privacy shield) extending outwardly from the keypad region 212, wherein the shroud at least partially surrounds a periphery 220 of the keypad region. Further, the body 204 may comprise one or more engagement features 222 configured to selectively engage the coupling region 206 of the card reader device 202 of FIG. 2A, thereby selectively coupling the body to the card reader device. For example, the one or more engagement features 222 may comprise a snap-lock feature 224 configured to engage the coupling region 206 of the card reader device 202. Preferably, the one or more engagement features 222 provide for a tool-less installation of the compliance apparatus 200 onto the card reader device 202.

The card reader device 202, for example, may normally comprise its own stock shroud (not shown) that would normally be coupled to the coupling region 206 by a similar snap-lock feature or other engagement feature (not shown). The body 204, for example, is comprised of a plastic or other synthetic material. In a preferred embodiment, the body 204 is comprised of the same or substantially similar material as the stock shroud. The body 204, for example, may be further comprised of a solid (e.g., not hollow) material that is similar in appearance to the card reader device 202.

As such, the stock shroud may be removed and replaced by the compliance apparatus 200, whereby the one or more engagement features 222 of the body 204 may utilize a similar engagement as the stock shroud. The one or more engagement features 222, for example, may alternatively, or in addition, comprise, a friction-fit feature or an interference-fit feature configured to selectively couple the body 204 to the coupling region 206 of the card reader device 202. In another example, an adhesive 226 may be provided, as illustrated in FIG. 3, wherein the adhesive is further configured to selectively couple the body 204 to the coupling region 206 of the card reader device 202 of FIG. 2A.

In accordance with another exemplary aspect of the disclosure, the card reader device 202 comprises an opening 228 configured to accept the card 102 of FIG. 1, wherein the card contains electronic data encoded in the machine readable medium 104, such as the microchip 106 or magnetic stripe 108. The body 204, in accordance with the present example, comprises a card-accepting region 230 associated with the opening 228 in the card reader device. The card-accepting region 230, for example, is proximate to a chip reader (not shown) of the card reader device 202 that is positioned within the opening 228 of the card reader device. While the present example discusses and illustrates the card-accepting region 230 being associated with a chip reader of the card reader device 202, the present disclosure further contemplates the card-accepting region being associated with a magnetic stripe reader 231 of the card reader device, whereby card-accepting region permits the magnetic stripe 108 of the card of FIG. 1 to be selectively inserted into and passed through the opening. As such, the structure of the body 204 may be configured to mimic at least a portion of the magnetic stripe reader 231 of FIG. 2A.

It should also be noted that the card-accepting region 230 of the body 204 shown in FIG. 2B, for example, may be configured differently than the example shown, wherein the card-accepting region may be configured to mate to any card reader device 202. In the present example, the card-accepting region 230 substantially surrounds a periphery 232 of the opening 228 in the card reader device 202 when the body 204 is coupled to the card reader device. Alternatively, the card-accepting region 230 may only partially surrounds the periphery 232 of the opening 228 in the card reader device 202. Regardless, the card-accepting region 230 generally permits the card 102 of FIG. 1 to be at least partially inserted into the opening 228 of the card reader device 202 FIGS. 2A-2B for reading of the electronic data by the card reader device when the body 204 is coupled to the card reader device.

In protecting consumer data, the present disclosure appreciates that it is important that electronic data encoded on the card 102 of FIG. 1 not be compromised, read, or otherwise affected by the compliance apparatus 202 of FIGS. 2A, 2B, and 3. Therefore, in accordance with the present disclosure, neither the body 204 nor any component of the compliance apparatus 202 has any capacity to read the electronic data encoded in the machine readable medium 104 of the card 102 of FIG. 1. As such, the compliance apparatus 202 may be utilized to simply detect whether inspections for identifying indications of tampering are being complied with, without sacrificing user confidentiality or data associated with the card 102.

While no apparatus or mechanism is present in the compliance apparatus 202 for reading or otherwise divulging or altering the electronic data encoded in the card 102, the present disclosure contemplates examples where the body 204 is configured to behave similarly to, or mimic, features normally present in the card reader device 200. For example, should the card reader device 200 comprise a light or other feature that indicates an insertion or failed insertion of the card 102 in the opening 228, the body 204 may further comprise one or more electronic features 234 configured to substantially mimic one or more regions of the card reader device, such as the coupling region 206 of the card reader device.

For example, the one or more electronic features 234 comprise one or more lights 236 (e.g., LEDs or the like) as shown in FIGS. 2B and 3, wherein the one or more lights are configured to selectively illuminate according to one or more predetermined conditions, such as the insertion of the card 102 of FIG. 1 into the opening 228. Alternatively, the one or more predetermined conditions may comprise the presence of the card 102 within the card-accepting region 230, an activation of one or more devices such as a presence indicator, or various other conditions associated with a typical operation of the card reader device 202.

Although the invention has been shown and described with respect to a certain embodiment or embodiments, it should be noted that the above-described embodiments serve only as examples for implementations of some embodiments of the present invention, and the application of the present invention is not restricted to these embodiments. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application. Accordingly, the present invention is not to be limited to the above-described embodiments, but is intended to be limited only by the appended claims and equivalents thereof.

The invention claimed is:

1. A compliance apparatus for monitoring compliance in fraud-prevention associated with a card reader device, the compliance apparatus comprising:
a body configured to be selectively coupled to the card reader device at a coupling region of the card reader device, wherein the body is configured to substantially mimic and at least partially overlay the coupling region of the card reader device when coupled to the coupling region, wherein the coupling region of the card reader device comprises an alphanumeric keypad having a plurality of keys, and wherein the body further comprises a keypad region, wherein the keypad region is configured to substantially overlay the alphanumeric keypad without impeding an operation of the plurality of keys, wherein the card reader device comprises an opening configured to accept a card containing electronic data encoded in a machine-readable medium, wherein the body comprises a card-accepting region associated with the opening, wherein the card-accepting region is configured to substantially surround a periphery of the opening when the body is coupled to the card reader device, and wherein the card-accepting region permits the card to be at least partially inserted into the opening for reading of the electronic data by the card reader device when the body is coupled to the card reader device, and wherein the body has no capacity to read the electronic data encoded in the machine-readable medium.

2. The compliance apparatus of claim 1, wherein the card reader device comprises one of a point-of-sale device and an automated teller machine.

3. The compliance apparatus of claim 1, wherein the card reader device comprises one of a chip reader and a magnetic stripe reader associated with the opening, and wherein the card-accepting region permits one of a respective chip and magnetic stripe of the card to be selectively inserted into the opening.

4. The compliance apparatus of claim 1, wherein the keypad region of the body is substantially grid-shaped and comprises a plurality of key openings defined by a plurality of intersecting bar members, wherein the plurality of keys of the alphanumeric keypad are configured to respectively pass through the plurality of key openings.

5. The compliance apparatus of claim 1, wherein the body further comprises a shroud extending outwardly from the keypad region, wherein the shroud at least partially surrounds a periphery of the keypad region.

6. The compliance apparatus of claim 1, wherein the card-accepting region is proximate to a chip reader associated with the opening of the card reader device when the body is coupled to the card reader device.

7. The compliance apparatus of claim 6, wherein the body further comprises a shroud extending outwardly from the keypad region, wherein the shroud at least partially surrounds a periphery of the keypad region.

8. The compliance apparatus of claim 1, wherein the body comprises one or more engagement features configured to selectively engage the coupling region of the card reader device, thereby selectively coupling the body to the card reader device.

9. The compliance apparatus of claim 8, wherein the one or more engagement features comprise one or more of a snap-lock feature, a friction-fit feature, and an interference-fit feature configured to selectively couple the body to the coupling region of the card reader device.

10. The compliance apparatus of claim 1, further comprising an adhesive, wherein the adhesive is configured to selectively couple the body to the coupling region of the card reader device.

11. The compliance apparatus of claim 1, wherein the body is comprised of a plastic.

12. A compliance apparatus for monitoring compliance in fraud-prevention associated with a card reader device, the compliance apparatus comprising:
a body configured to be selectively coupled to the card reader device at a coupling region of the card reader device, wherein the body is configured to substantially mimic and at least partially overlay the coupling region of the card reader device when coupled to the coupling region, wherein the body further comprises one or more electronic features configured to substantially mimic the coupling region of the card reader device, wherein the card reader device comprises an opening configured to accept a card containing electronic data encoded in a machine-readable medium, wherein the body comprises a card-accepting region associated with the opening, wherein the card-accepting region is configured to substantially surround a periphery of the opening when the body is coupled to the card reader device, and wherein the card-accepting region permits the card to be at least partially inserted into the opening for reading of the electronic data by the card reader device when the body is coupled to the card reader device, and wherein the body has no capacity to read the electronic data encoded in the machine-readable medium.

13. The compliance apparatus of claim 12, wherein the one or more electronic features comprise one or more lights configured to selectively illuminate according to one or more predetermined conditions.

14. The compliance apparatus of claim 13, wherein the one or more predetermined conditions comprise one or more of an insertion of the card into the opening, a presence of the card within the card accepting region, and an activation of one or more devices associated with the card reader device.

15. A compliance apparatus for monitoring compliance in fraud-prevention associated with a card reader device, the compliance apparatus comprising:
   a body configured to be selectively coupled to the card reader device at a coupling region of the card reader device,
   wherein the body is configured to at least partially overlay the coupling region of the card reader device when coupled to the coupling region,
   wherein the card reader device comprises a card-reading region configured to accept a card containing electronic data encoded in a machine-readable medium,
   wherein the coupling region of the card reader device comprises an alphanumeric keypad having a plurality of keys,
   wherein the body comprises a keypad region configured to substantially overlay the alphanumeric keypad without impeding an operation of the plurality of keys,
   wherein the body comprises a card-accepting region associated with the card-reading region,
   wherein the card-accepting region is configured to substantially surround at least a portion of the card-reading region when the body is coupled to the card reader device,
   wherein the card-accepting region permits the card to be at least partially inserted into the card-reading region for reading of the electronic data by the card reader device when the body is coupled to the card reader device, and
   wherein the body has no capacity to read the electronic data encoded in the machine-readable medium.

16. The compliance apparatus of claim 15, wherein the card-accepting region is proximate to a chip reader associated with the card-reading region of the card reader device when the body is coupled to the card reader device.

17. The compliance apparatus of claim 16, wherein the body further comprises a shroud extending outwardly from the keypad region, wherein the shroud at least partially surrounds a periphery of the keypad region.

18. The compliance apparatus of claim 15, wherein the body comprises one or more engagement features configured to selectively engage the coupling region of the card reader device, thereby selectively coupling the body to the card reader device.

19. The compliance apparatus of claim 18, wherein the one or more engagement features comprise one or more of a snap-lock feature, a friction-fit feature, and an interference-fit feature configured to selectively couple the body to the coupling region of the card reader device.

* * * * *